US012688540B2

(12) United States Patent
Flocken et al.

(10) Patent No.: US 12,688,540 B2
(45) Date of Patent: Jul. 21, 2026

(54) DYNAMIC, REAL-TIME SERVICE FOR DISCOVERING POTENTIAL ONLINE DECEPTION RELATING TO CHARACTERISTICS OF PEOPLE USING INTERNET DATING APPLICATIONS

(71) Applicant: SafeHer, Inc., Lewes, DE (US)

(72) Inventors: Philip Andrew Flocken, Denver, CO (US); Kalie Marie Nitzsche, Naperville, IL (US); Jacqueline Saleem, Reno, NV (US); Scott Snapp, Denver, CO (US)

(73) Assignee: SafeHer, Inc., Naperville, IL (US)

( * ) Notice: Subject to any disclaimer, the term of this patent is extended or adjusted under 35 U.S.C. 154(b) by 137 days.

(21) Appl. No.: 18/656,566

(22) Filed: May 6, 2024

(65) Prior Publication Data

US 2025/0342547 A1     Nov. 6, 2025

(51) Int. Cl.
*G06Q 10/40*          (2026.01)
*G06Q 50/26*          (2024.01)

(52) U.S. Cl.
CPC ........... *G06Q 50/265* (2013.01); *G06Q 10/40* (2026.01)

(58) Field of Classification Search
CPC ... G06Q 50/01; G06Q 50/265; G06F 16/3325
See application file for complete search history.

(56) References Cited

U.S. PATENT DOCUMENTS

| | | | | |
|---|---|---|---|---|
| 8,943,047 B1 * | 1/2015 | Carpio | ................... | G06Q 10/06 |
| | | | | 707/723 |
| 10,521,580 B1 * | 12/2019 | Fox | ......................... | G06Q 50/01 |
| 2005/0027672 A1 * | 2/2005 | Arndt | .................... | H04L 67/306 |

(Continued)

FOREIGN PATENT DOCUMENTS

| | | | | | |
|---|---|---|---|---|---|
| CN | | 113536136 A | * | 10/2021 | ......... G06F 16/9538 |
| WO | WO-2025049832 A1 | * | 3/2025 | ............. G06N 20/20 |

OTHER PUBLICATIONS

English Translation of CN-113536136-A (Year: 2021).*

(Continued)

*Primary Examiner* — Emmett K. Walsh
*Assistant Examiner* — Michael C Moroney
(74) *Attorney, Agent, or Firm* — CHRISTOPHER J CHAN IP LAW, LLC

(57)          ABSTRACT
A person (the user) interested in determining the authenticity of another person (the subject) enters the subject's name and other information into a mobile app or associated website. The subject information is then sent to a server program to automatically perform iterative searches for correlated online information. The server program also executes an analysis engine to perform unique heuristic and pattern matching analysis on the subject data and search results. The analysis engine is composed of a rules-based component, a machine learning pattern discovery component, and a machine learning pattern detection component. Search and analytics results are aggregated for presentation to the user in the app and website UI, organized in a categorical manner based on topic area. The result set consists of identified subject attributes that are potential areas of concern, subject attributes aligning to certain predictive trends, and subject information found on the internet.

14 Claims, 4 Drawing Sheets

(56) References Cited

U.S. PATENT DOCUMENTS

| | | | |
|---|---|---|---|
| 2006/0288090 A1* | 12/2006 | Kraft | H04L 63/08 |
| | | | 709/219 |
| 2008/0320124 A1* | 12/2008 | Lee | G06F 16/958 |
| | | | 709/224 |
| 2009/0282023 A1* | 11/2009 | Bennett | G06F 16/35 |
| | | | 707/999.005 |
| 2013/0097246 A1* | 4/2013 | Zifroni | H04W 4/029 |
| | | | 709/204 |
| 2014/0258296 A1* | 9/2014 | Chen | G06F 16/2455 |
| | | | 707/737 |
| 2015/0262129 A1* | 9/2015 | Maynard | G06Q 50/265 |
| | | | 705/14.66 |
| 2018/0032526 A1* | 2/2018 | Cudak | G06F 16/24578 |
| 2019/0220545 A1* | 7/2019 | Tripodi | G06Q 50/01 |

OTHER PUBLICATIONS

Reicher, Alexander; "The Background of Our Being: Internet Background Checks in the Hiring Process"; Published 2013; Berkeley Technology Law Journal, vol. 28:115, pp. 115-154 (Year: 2013).*

* cited by examiner

S26 S30

ANALYTICS ENGINE 15

S27

CONSISTENCY INSPECTION &
HEURISTIC RULES ENGINE
23

S28

K-MEANS CLUSTERING ALGORITHM FOR PATTERN DISCOVERY $$\underset{S}{\arg\min} \sum_{i=1}^{k} \sum_{x \in S_i} \|x - \mu_i\|^2$$

S = sets of observations k = number of sets of predictions x = initial random data point μ = mean of points in $S_i$

24

S29

S31

ARTIFICIAL NEURAL NETWORK FOR PATTERN RECOGNITION

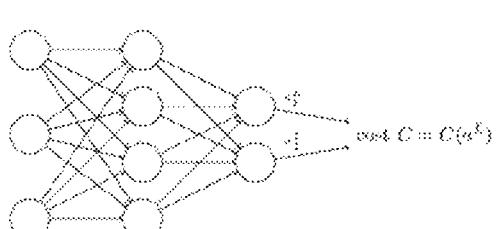

$$\delta^L = \nabla_a C \odot \sigma'(z^L)$$

$$\delta^l = ((w^{l+1})^T \delta^{l+1}) \odot \sigma'(z^l)$$

$$\frac{\partial C}{\partial b_j^l} = \delta_j^l$$

$$\frac{\partial C}{\partial w_{jk}^l} = a_k^{l-1} \delta_j^l$$

cost $C = C(a^L)$

C     cost / loss (delta) function
L     number of network layers
a     activation
z     weighted input for current layer
w     weighting coefficient
l     current layer
T     transpose
b     bias
j     output neuron
k     input neuron

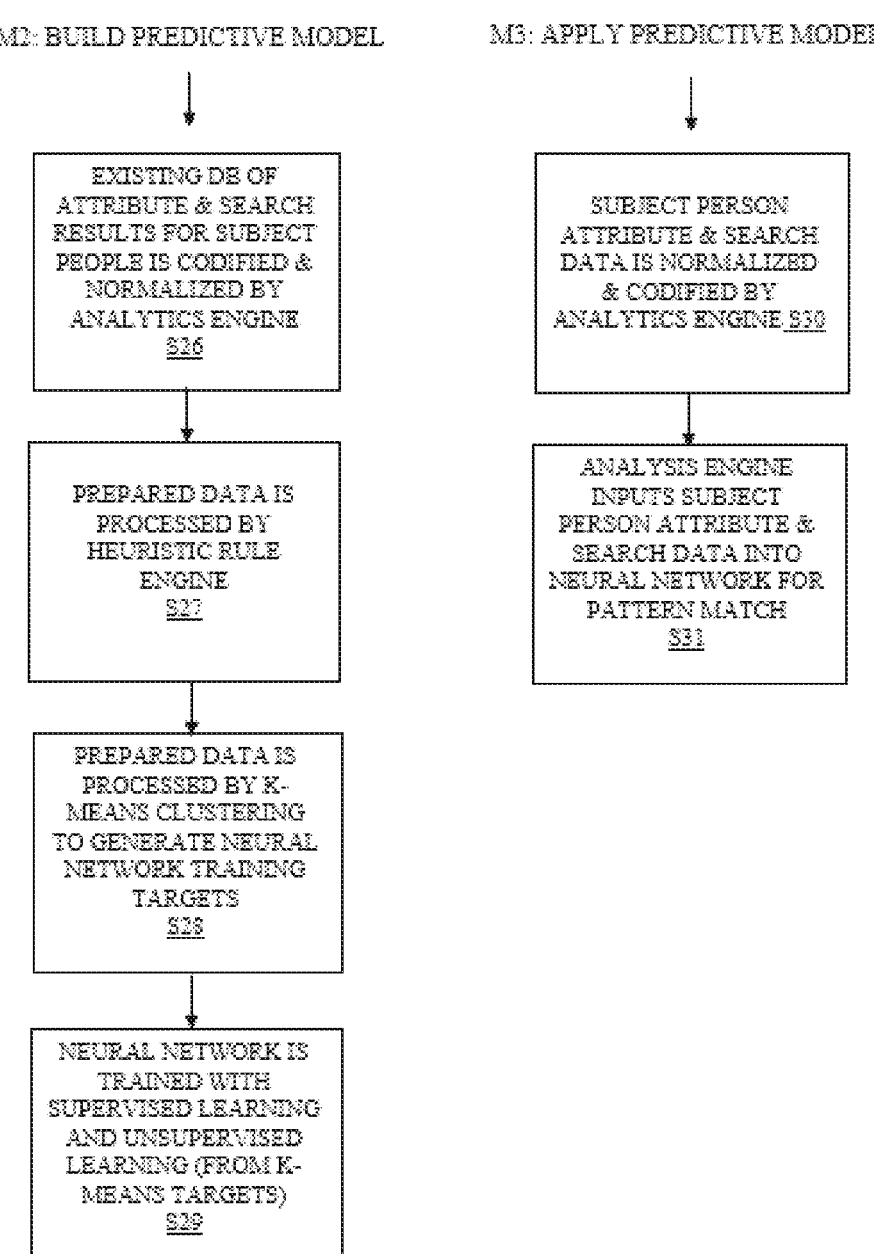

M2: BUILD PREDICTIVE MODEL

M3: APPLY PREDICTIVE MODEL

EXISTING DB OF
ATTRIBUTE & SEARCH
RESULTS FOR SUBJECT
PEOPLE IS CODIFIED &
NORMALIZED BY
ANALYTICS ENGINE
S26

PREPARED DATA IS
PROCESSED BY
HEURISTIC RULE
ENGINE
S27

PREPARED DATA IS
PROCESSED BY K-
MEANS CLUSTERING
TO GENERATE NEURAL
NETWORK TRAINING
TARGETS
S28

NEURAL NETWORK IS
TRAINED WITH
SUPERVISED LEARNING
AND UNSUPERVISED
LEARNING (FROM K-
MEANS TARGETS)
S29

SUBJECT PERSON
ATTRIBUTE & SEARCH
DATA IS NORMALIZED
& CODIFIED BY
ANALYTICS ENGINE S30

ANALYSIS ENGINE
INPUTS SUBJECT
PERSON ATTRIBUTE &
SEARCH DATA INTO
NEURAL NETWORK FOR
PATTERN MATCH
S31

FIG. 4

DYNAMIC, REAL-TIME SERVICE FOR DISCOVERING POTENTIAL ONLINE DECEPTION RELATING TO CHARACTERISTICS OF PEOPLE USING INTERNET DATING APPLICATIONS

BACKGROUND OF THE INVENTION

The present invention relates to mobile device and internet technology, and, more particularly, to a method for a person engaging in online dating activity to become aware of potential deception, inconsistencies, or areas of concern associated with another person who they are interested in. The invention consists of an approach for providing a user with a consolidation of publicly available online information, along with identified attributes for consideration, by utilizing a unique methodology that combines iterative internet search algorithms with patterns determined through machine learning algorithms.

In modern society, many people use handheld devices (such as smartphones and tablets) as mobile computers to place and receive calls, send and receive text messages or email, access internet sites via mobile web browsers, gain real-time status information, or interact with data or other people using software applications ("apps") that can be downloaded and executed on various mobile devices. Many mobile apps communicate with server software programs or a combination of "cloud" computing services (hosted on hardware servers) in order to update, aggregate, analyze, calculate, and/or disseminate real-time information.

Many people in today's society are very busy, and do not have time to meet or communicate in historically conventional ways. This has given rise to vendor services such as internet dating (for example, "Bumble®" and "Tinder®"), as well as social networking platforms (for example, "Facebook®"). Users of such services typically create a profile of online information describing their background and interests in order to initially match and interact with other users virtually, either via a web browser or a mobile app that connects to the vendor's servers or cloud services. Based on this information, virtual interactions may ultimately lead users to meet in person. Unfortunately, some users may choose to falsify or omit important information about their background in their online profile or virtual interactions. However, internet dating apps and social media platforms do not fully verify user background information. As a result, some users become victims of fraud, and some are subjected to physical harm or death if they interact with someone who they did not know was dangerous. Since no comprehensive validation of user data exists, users have resorted to individual efforts to verify information about other users, by directly performing isolated internet searches or by joining online communities where they might obtain additional knowledge through sharing information and asking questions (for example, on sites such as "Are We Dating the Same Guy?", which have been implemented in "Facebook®" for major cities around the world, with members numbering in the hundreds of thousands). The problem of determining if someone is who they say they are online is vast and pervasive, and there is presently no comprehensive solution that is automated.

Technology to search data on the internet currently exists, and can be initiated directly by a person using a search app or web browser connecting with an internet search service (such as "Google®"), or by a software program that either (1) invokes an http or https URL request directed at a search service, or (2) executes a search request to a search service through the use of a search API. Additionally, a number of various data analytics algorithms currently exist for discovering or identifying patterns in data sets. These include, but are not limited to, software programs that perform statistical analysis algorithms and machine learning algorithms, such as artificial neural networks. Such technology is leveraged by the invention in a unique manner, in order to perform internet searches and data analysis.

SUMMARY OF THE INVENTION

The invention provides a unique mechanism for searching multiple sources of publicly available information on the internet, and providing a user with real-time, dynamic results consisting of (1) a consolidated summary of direct and iterative search results, and (2) trends determined to be potentially concerning based on the results. The user interface (UI) is available via a mobile software application ("app") as well as via a web site. In the UI, a user will enter expected information about a person they are interested in (the "subject" person). Once this information is entered, the user submits the information via the UI. The app (or associated website) then sends this information to a server program. The server program uses this information as search criteria.

A person interested in using the app will first download it to their mobile device. The person will then use the app, or alternatively the associated web site, to register as a user or enter as a guest. To register, a user will be required to create a username/login and valid password, along with fundamental information for identification such as first, middle, and last name, physical address, email address, phone number, and nationality. To use the app or web site as a guest, the user must enter an email address. The registered user or guest user is presented with a EULA (End User License Agreement) screen specifying the terms and conditions for using the app, web site, and associated services. The user must accept these terms and conditions in order to use these services, including access to view basic search results for free. A registered user interested in premium services (iterative search and data analysis) must also provide a credit or debit card number (or identifiers for an alternative online payment mechanism, such as Venmo®), and will indicate a one-time payment or subscription sign-up. The app (or associated web site) then connects with an online payment verification service in order to authenticate the user's information. Once the user's information is accepted, the user must agree to payment terms for using the app/web site to receive premium services. The app or associated web site then sends the user's information to a secure server database for storage.

To initiate a search from the app or web site UI, a user will first enter expected information about a person they are interested in (the "subject" person). The user must enter the person's expected name, and optionally may enter additional details if potentially known, such as nick name(s), physical address(es), age, phone number(s), and email address(es). The user may also attach one or more expected digital images of the person, if available. Once this information is entered, the user submits the information via the UI, and it is sent from the app or web site to a server program. A "Thank You" message in the UI is then displayed to the user, including a prompt asking the user if they would like to wait for the results to be returned in the UI, or notified via text message or email with a link to the results once they are ready.

The server program uses the submitted information as search criteria for searching public internet information via search APIs (Application Programming Interfaces) and http/https protocols leveraging existing search applications such as Google® and Bing® for general searches (including image searches). Search criteria will be sent to AI (Artificial Intelligence) internet platforms such as ChatGPT as well. Specific sites that are also searched include, but are not limited to, Facebook® (including the "Are We Dating the Same Guy?" sites), LinkedIn®, property records, marriage license records, criminal/sex offender records, bankruptcy and lien records, birth certificate records, education records, dating sites, and additional social media sites such as Instagram®, TikTok™, and Snapchat®. Some sites may require a login, in which case an internet "bot" software program may be utilized to gain access and then perform a search and return results in a manner meeting the data compliance requirements of these sites.

Search results are presented in a tabular manner in the UI. Tabbed pages are grouped by search category and include a "General" tab, "Images" tab, "Dating & Marriage History" tab, "Education & Profession" tab, "Public Records" tab, and "Social" tab for social media results. Within each category page, results are presented with links that the user can click to gain additional information about each distinct result. The "General" category also includes the number of times the subject person has been searched by others. If no results for a specific search were returned, or if an error occurred while attempting a specific search, a message indicating that those particular results were not accessible will be displayed instead. Additionally, if a user searches for more than one subject person, a tabbed area in the UI will be created for each subject person, and the category tabs will occur within each subject person area.

If a registered user has paid for premium services (iterative search and data analysis), the server program will initiate an iterative search process by parsing the initial search results to extract discrete attribute values specific to the subject person, and will store these values in tables in a secure database. Such values include, but are not limited to, nick names/aliases and other associated family names, images and image metadata, physical addresses, email addresses, dating site and social media login names, marriage status, school names, and company names along with job positions. The server program then automatically launches a newly refined general search, using these attribute values paired with the subject person's expected name. The results of this second search are added to the tabular results pages in the UI. Finally, the server program parses another set of attribute values for the subject person from the second search, storing them in the database in additional tables, and then again executing a search on these values paired with the subject person's expected name. The results of this third search are also added to the tabular results pages in the UI. After the third search, n number of variable additional iterative searches may be executed, based on an iterative search parameter setting in the server program. The server program tracks users' average click-through rates (CTRs) on links in the result pages to dynamically determine if additional iterative searches are typically needed, and adjusts the iterative search parameter accordingly. The search program also automatically follows into hyperlinks within result sets as needed in order to determine the discrete attribute values.

For premium service users, once the iterative search process described above is completed, the server program will initiate a data analytics procedure via an analytics engine. First, the subject person's attribute data (derived from the search results) is compared against the complete set of search results in order to identify potential inconsistencies. For example, if the subject person indicated a status of "unmarried" in a recent dating profile, but a current marriage certificate was retrieved from a public records search, a potential inconsistency for marriage status will be reported in an "Analytics" tab of the UI. Next, the analytics engine executes a heuristic evaluation of the subject person's attribute data by comparing the attribute values to normalized rules which have been established around expected probabilities and general knowledge. For example, if the subject person is determined to have an excessive number of email addresses, physical properties, phone numbers, or dating site aliases, these may be raised as areas of potential concern and summarized in the "Analytics" results tab of the UI. Images of the subject person are compared against stock photo libraries as well, and potential matches are also shown in the "Analytics" results tab of the UI.

Finally, the analytics engine executes pattern detection analysis by inputting the subject person's data attributes into a dynamic predictive data model built across the attribute data and search results of all subject people in the database. The predictive data model is formed and managed by an artificial neural network (ANN), and compares how the subject person's data relates to trends identified across similar data for others in the database. For example, the predictive data model may have determined that people that participate in a certain number of dating sites and that have certain characteristics in their profile tend to date more people, more frequently, and for shorter periods of time. These patterns are compared to the subject person's characteristics in this regard to determine if the subject person matches with these tendencies to some degree. If there is a likely match, this is reported as a potential area of concern in the "Analytics" results tab of the UI. The predictive data model of the ANN is built and trained through a supervised machine learning process as well as an interface to an unsupervised k-means clustering algorithm which is used to discover potential pattern clusters from the overall data set. This is a novel approach for augmenting a controlled domain data set for supervised learning of an ANN with an emergent, unsupervised one. More details on this approach are provided in the DETAILED DESCRIPTION section below.

Once all results have been added into the result tabs of the UI, the server program will also add a certification marker, including the current date, in the "General" results tab to indicate that the results have been completed at this time. In addition to the generated results tabs, an additional "Hints" tab is presented to the user, which contains general information and links on how to safely interact with others online and safely meet in person.

It will be apparent to those skilled in the art that various modifications, variations, and embodiments of the present invention can be made without departing from the spirit or scope of the invention. Although described here in the context of detecting potential deception involved with online dating, the invention is clearly relevant for other applications and contexts that would benefit from detecting potentially deceptively harmful behavior.

The app and associated web site leverage existing technology in the form of web services, cloud services, and secure, fault-tolerant, redundant database repositories available via cloud servers and multi-threaded server applications. The app is implemented and available as a native app for different mobile devices running popular operating systems such as iOS® and Android®.

These and other features and advantages of the invention are apparent from the description below with reference to the following drawings.

BRIEF DESCRIPTION OF THE DRAWINGS

FIG. 3 is a block diagram depicting the core elements of the analysis engine component shown in FIG. 1.

FIG. 4 is a flow chart indicating the methodology for building and using a predictive data model as part of the analysis engine component.

DETAILED DESCRIPTION

Figure 1:
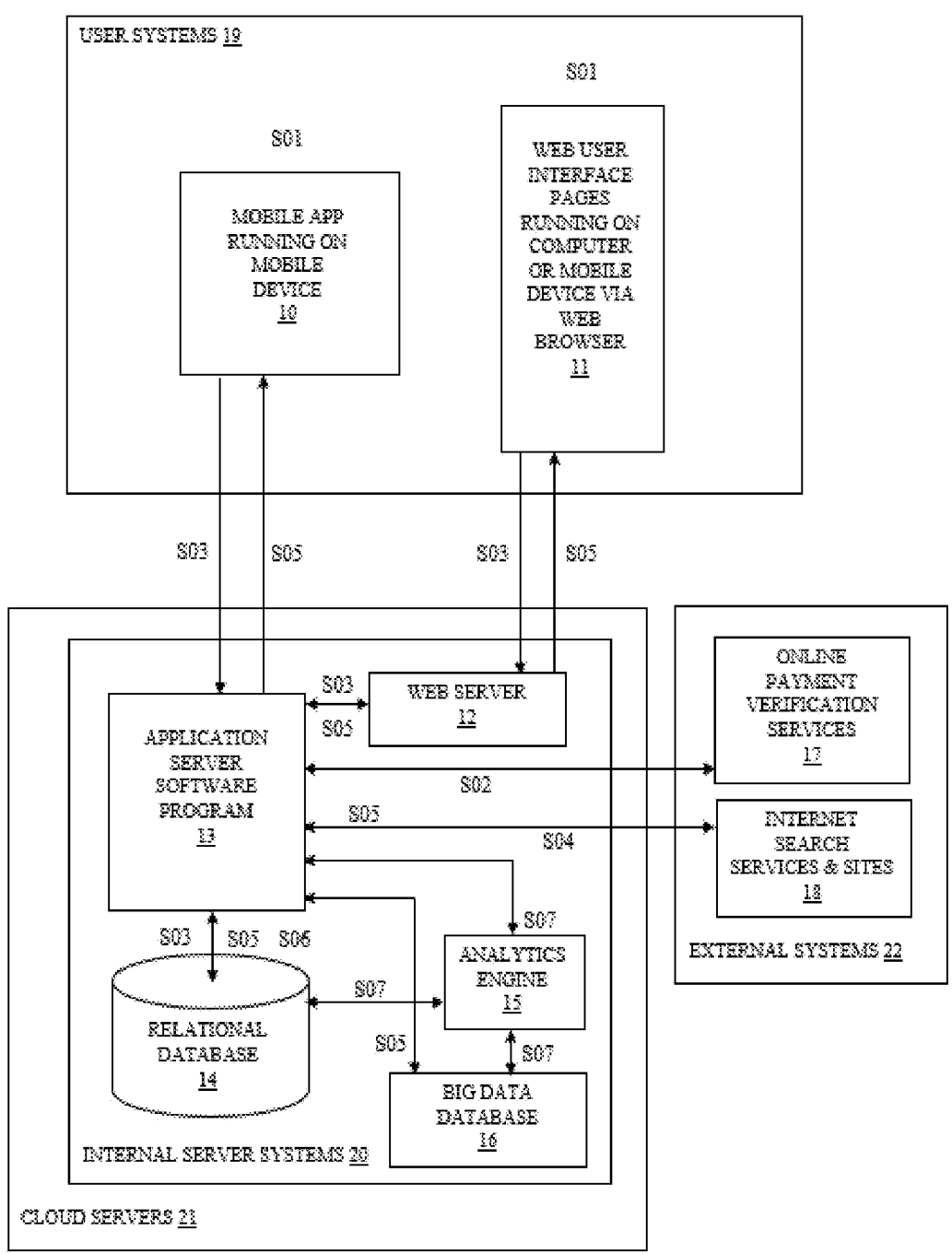
FIG. 1 is a block diagram of interaction methods between mobile device application instances, a web service, cloud services, and other underlying systems in accordance with the present invention.
Figure 2:
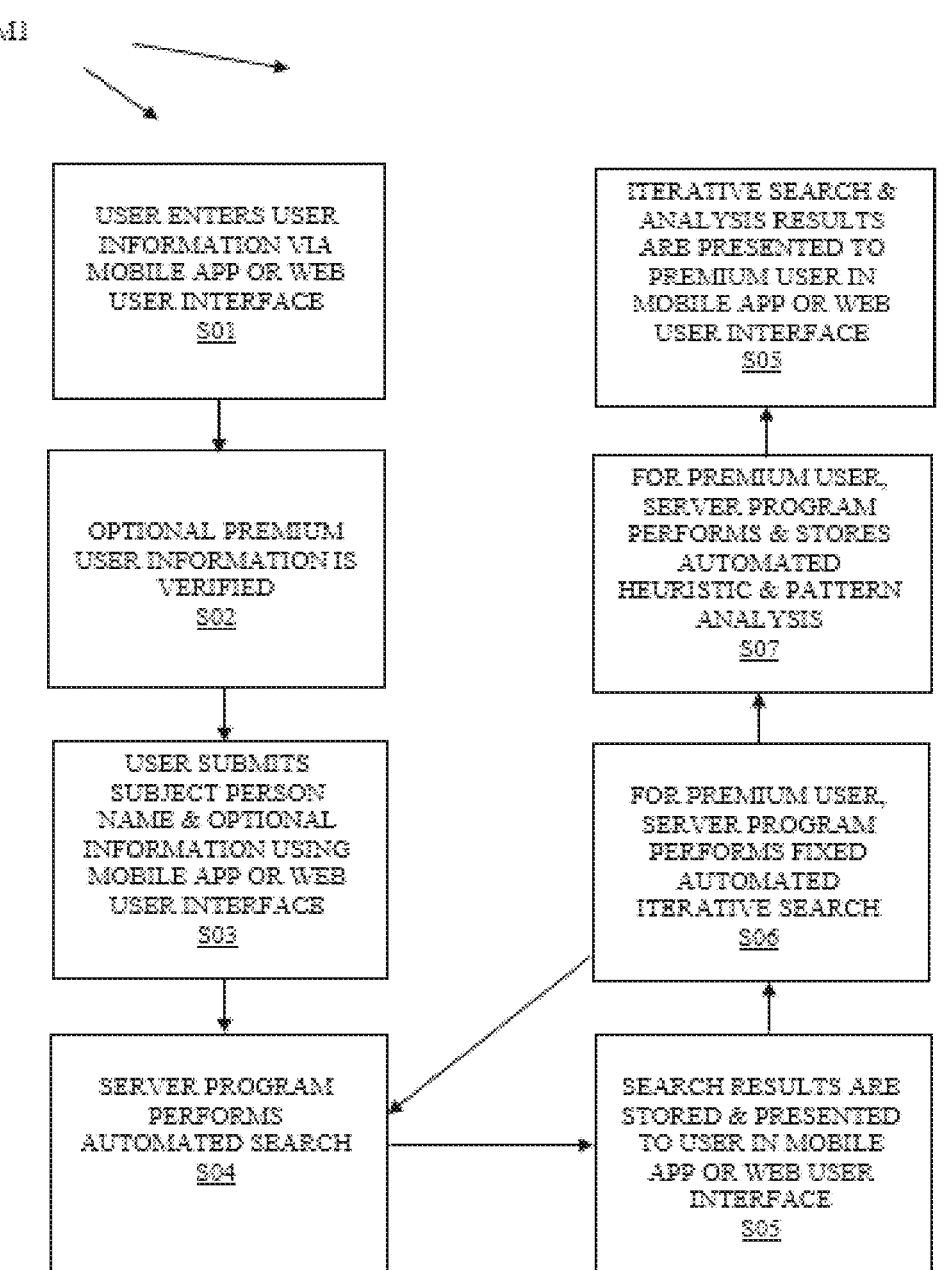
FIG. 2 is a flow chart outlining the primary use case method and associated sequence of operations for the invention.

In accordance with the present invention, a set of systems 20 provide deception detection services to human users operating user systems 19 (mobile device apps 10 residing on mobile devices, and web browser user interface pages 11), as shown in FIG. 1. Internal server systems 20 are comprised of an application server software program 13, web server 12, data repository 14, 16, and analytics engine 15, all of which are deployed on fault tolerant, redundant, and scalable load-balanced cloud servers 21 provided by a cloud service provider such as AWS® (or could alternatively reside on a private vendor's hardware servers). The application server software program 13 is the central control system, and coordinates input and output actions and communications with mobile apps 10, the web server 12, the databases 14, 16, analytics engine 15, and external systems 22 such as online payment verification services 17 and internet search services 18 provided by other vendors. The application server software program 13 and web server 12 reside in a multi-threaded server container such as JBoss® or WildFly® with Apache® Tomcat®. The application server may further be cloud enabled within a virtual machine container such as Kubernetes®.

Initially, a new user downloads the mobile app 10 and enters user information in step S01 of method M1. Alternatively, the user may enter user information via a web browser 11. In addition to supplying user information, the user will also submit known or expected information specific to a subject person in step S03. The mobile app 10, or web browser 11 with web site 12, sends the user information and subject person information to the application server software program 13, which stores the user information and subject person information in relational database 14. If the user signs up for premium services via the user interface (UI) of the mobile app 10 or web UI 11, the application server software program 13 will additionally verify the user's payment information by using an external online service 17 as indicated in step S02. In all cases, data transmission between systems occurs in encrypted format using standard available encryption protocols.

Once the application server software program 13 receives the user information and subject person information, the application server software program 13 automatically initiates a set of internet searches in step S04 using internet search services 18 as described earlier in the SUMMARY OF THE INVENTION section. When the search results are returned, the application server software program 13 then stores the search results in a Big Data database 16 (for example, Apache® HBase®) as denoted in step S05. Search results are linked to user and subject person information residing in relational database 14, and presented to the user in tabular format based on topic area via the UI of the mobile app 10 or web UI 11.

For a premium user, the application server software program 13 will next initiate an iterative search process (step S06) by parsing the initial search results to extract discrete attribute values specific to the subject person, and will store these values in tables in the relational database 14. The application server software program 13 then automatically launches a newly refined general search 18, based on attribute values paired with the subject person's expected name. The results of this second search are stored in relational database 14 and Big Data database 16, and added to the tabular results pages in the UI of the mobile app 10 or web UI 11. Finally, the application server software program 13 parses another set of attribute values for the subject person from the second search result set, storing them in databases 14, 16 as additional data, and then again executing a search 18 on these values paired with the subject person's expected name. The results of this third search are also added to the tabular results pages in the UI of the mobile app 10 or web UI 11. This process may be repeated n number of additional times, based on an iterative search parameter setting in the application server software program 13 that is dynamic and automatically derived from users average number of click-through rates (CTRs) on links in the result pages.

In order to provide an additional level of data privacy, hash code keys are created from an index of user or subject names (stored separately in database 14) paired with date and time of initial usage, and stored in a hash table. Data stored in the databases 14, 16 (user data, subject attribute data, and search results) is hence tokenized and referenced via the hash code keys so that search result data is not linked explicitly to user or subject person information.

For a premium user, the application server software program 13 will finally execute the analytics engine 15 using the subject person's attributes as input in step S07. Analysis results are added to the tabular results pages in the UI of the mobile app 10 or web UI 11.

The analytics engine 15 is composed of a heuristic rule engine 23, a pattern discovery algorithm 24, and a machine learning pattern recognition system 25. The heuristic rule engine 23 first performs a consistency inspection by comparing the subject person's attribute information with retrieved search results, and adding potential inconsistencies to the report presented to the user. Next, the heuristic rule engine 23 evaluates the subject person's attribute data by comparing the attribute values to normalized rules which have been established around expected probabilities and general knowledge, and again reports potential areas of concern in the tabular results presented to the user (S27).

The artificial neural network component 25 of the analytics engine 15 uses a predictive model to compare how the subject person's data relates to trends identified across similar data for others in the database (Method M3). The subject person's attribute information is codified (step S30) and input into the artificial neural network 25, which identifies patterns matching the subject person based on tendencies already identified in the databases of attributes and search results for other subject people (step S31). The pattern matching results are then added to the tabular results presented to the user. The depiction and formula set shown in diagram 25 illustrate a backpropagation neural network, but a cascade correlation network or other non-linear approaches such as Support Vector Machines may be applied as well. Artificial neural networks are now common technology and can be constructed and managed through frameworks such as Google® TensorFlow® or Amazon® SageMaker®.

In order to use the predictive model for pattern matching, the predictive model must first be built and trained (Method M2). This is accomplished by first codifying and normalizing existing database results (step S26), and then inputting this information into the artificial neural network along with expected results for each discrete input set (supervised training S29). This is further augmented by a k-means data clustering algorithm 24 to identify new, unforeseen patterns in the data set spanning the relational database 14 and Big Data database 16. Newly identified patterns from the k-means clustering algorithm 24 in the form of input and expected correlated output are fed into the artificial neural network 25 to further reinforce the predictive model training and hence pattern matching accuracy (step S28).

Additionally, the overall solution may be implemented in a way to provide for localization/internationalization so that various users speaking various languages will be able to use the service in their own natural language. Existing automatic natural language translation technology may be used to dynamically translate attribute values and present them to users in the language of their choice. The solution may further be implemented to meet the mobile device accessibility needs of users with disabilities, and may include a prompt area in the UI for users to enter information via a Large Language Model (LLM) AI interface as well.

All software referred to herein is provided on computer-based systems or media. Other variations upon and modifications to the detailed embodiments are provided for by the present invention, the scope of which is defined by the following claims.

What is claimed is:

1. A method for determining authenticity of a subject based on online information associated with the subject, the method comprising:

receiving from a user via a mobile device application or web user interface (UI), the subject's name and other known or expected information pertaining to the subject;

receiving the subject's name and other known or expected information from the mobile device application or web UI at a computer server;

based at least in part on the subject's name and other known or expected information, automatically performing an initial internet search executed by the computer server to obtain initial search results;

based at least in part on the subject's name and other known or expected information paired with the initial search results, automatically performing iterative internet searches executed by the computer server to obtain one or more iterative search results;

automatically analyzing the one or more initial and the one or more iterative search results to obtain one or more analysis results comprising one or more key attributes associated with the subject;

automatically aggregating and consolidating some or all of the iterative search and analysis results on the computer server, and transmitting the some or all of the iterative search and analysis results from the computer server to the mobile device application or web UI;

formatting the some or all of the iterative search and analysis results in a tabular manner grouped by topic area to be presented in the mobile device application or web UI, wherein the iterative search and analysis results comprise one or more links to associated search and analysis results information;

tracking, by the computer server, users' average click-through rates (CTRs) on the one or more links;

based at least in part on the users' average CTRs on the one or more links, adjusting an iterative search parameter; and based on the iterative search parameter, performing additional iterative searches to obtain one or more additional iterative search results.

2. A method as recited in claim 1 wherein the iterative internet searches comprise parsing search results to extract some or all of the key attributes to store on the computer server with the iterative search and analysis results.

3. A method as recited in claim 2 wherein the iterative internet searches comprise the computer server using the key attributes paired with initial subject information to perform a refined iterative internet search.

4. A method as recited in claim 3 wherein the iterative internet searches comprise the computer server parsing refined search results to generate additional key attributes to store in the computer server.

5. A method as recited in claim 4 wherein the iterative internet searches comprise the computer server using the additional key attributes paired with initial subject information to perform a second refined iterative internet search.

6. A method as recited in claim 5 wherein performing the iterative internet searches further comprises:

based at least in part on key attributes paired with initial subject information, and further based on the users' average CTRs on the one or more links, performing additional refined iterative internet searches "n" additional number of times.

7. A method as recited in claim 1 wherein initial and iterative internet searches comprise the computer server storing user information and key attributes in a first database, and storing iterative search and analysis results in a second database.

8. A method as recited in claim 1 wherein data analysis is facilitated by a computer program and performed on the computer server such that key attributes are compared to iterative search and analysis results, and discrepancies are added to the some or all of the iterative search and analysis results presented to the user in the mobile device application or web UI.

9. A method as recited in claim 1 wherein data analysis is facilitated by a computer program and performed on the computer server such that key attributes are compared to preset heuristic trends, and matches are added to the some or all of the iterative search and analysis results presented to the user in the mobile device application or web UI.

10. A method as recited in claim 1 wherein data analysis is facilitated by a computer program and performed on the computer server such that key attributes and iterative search and analysis results are compared to predefined trends accessed by the computer server using a machine-learning predictive data model, and matches are added to the some or all of the iterative search and analysis results presented to the user in the mobile device application or web UI.

11. A method as recited in claim 1 wherein data analysis is facilitated by a computer program executing on the computer server such that a machine-learning predictive data model is constructed by supervised training and based on input from a pattern detection algorithm.

12. A method as recited in claim 1 wherein performing the iterative internet searches further comprises:

based on the users' average CTRs on the one or more links, performing additional refined iterative internet searches "n" additional number of times.

13. A method for determining authenticity of a subject based on online information associated with the subject, the method comprising:

receiving from a user via a mobile device application or web user interface (UI), the subject's name and other known or expected information pertaining to the subject;

receiving the subject's name and other known or expected information from the mobile device application or web UI at a computer server;

based at least in part on the subject's name and other known or expected information, automatically performing an initial set of internet searches executed by the computer server to obtain one or more initial search results;

based atleast in part on the subject's name and other known or expected information paired with the one or more initial search results, automatically performing iterative internet searches executed by the computer server to obtain one or more iterative search results;

automatically analyzing the one or more initial and the one or more iterative search results to obtain one or more analysis results comprising one or more key attributes associated with the subject;

automatically aggregating and consolidating some or all of the iterative search and analysis results on the computer server, and transmitting the some or all of the iterative search and analysis results from the computer server to the mobile device application or web UI;

formatting the some or all of the iterative search and analysis results in a tabular manner grouped by topic area to be presented in the mobile device application or web UI, wherein the results comprise one or more links to associated search and analysis results information;

tracking, by the computer server, users' average click-through rates (CTRs) on the one or more links;

based at least in part on the users' average CTRs on the one or more links, adjusting an iterative search parameter; and based on the iterative search parameter, performing additional iterative searches to obtain one or more additional iterative search results.

14. A system for determining authenticity of a subject based on online information associated with the subject, the system comprising:

a mobile device application or web user interface (UI) module operable to:

receive from a user via a mobile device application or web user interface (UI), the subject's name and other known or expected information pertaining to the subject;

receive the subject's name and other known or expected information from the mobile device application or web UI at a computer server; and the computer server operable to:

based at least in part on the subject's name and other known or expected information, perform an initial set of internet searches executed by the computer server to obtain one or more initial search results;

based at least in part on the subject's name and other known or expected information paired with the one or more initial search results, perform iterative internet searches to obtain one or more iterative search results;

analyze the one or more initial and the one or more iterative search results to obtain one or more analysis results comprising one or more key attributes associated with the subject;

aggregate and consolidate some or all of the iterative search and analysis results, and transmitting the some or all of the iterative search and analysis results to the mobile device application or web UI;

format the some or all of the iterative search and analysis results in a tabular manner grouped by topic area to be presented in the mobile device application or web UI, wherein the results comprise one or more links to associated search and analysis results information; and track users' average click-through rates (CTRs) on the one or more links;

based at least in part on the users' average CTRs on the one or more links, adjust an iterative search parameter;

and based on the iterative search parameter, perform additional iterative searches to obtain one or more additional iterative search results.

* * * * *